United States Patent Office 2,837,434
Patented June 3, 1958

2,837,434

DENTAL IMPRESSION COMPOSITION

Robert S. Grumbine, Chicago, Ill., assignor to Coe Laboratories, Inc., Chicago, Ill.

No Drawing. Application February 4, 1955
Serial No. 486,270

9 Claims. (Cl. 106—38.35)

This invention relates to an improved dental impression composition and more particularly relates to a dental impression material containing potassium ferric fluoride as an essential constituent.

In the making of dentures and the like an accurate reproduction of particular portions of the mouth is a basic consideration. Accordingly, the art of making reproductions has become highly developed with the initial portion of the operation involving the taking of an impression in suitable moldable material which can conform completely to the surfaces whose reproduction is sought. From the mold thus obtained, a reproduction is made in the form of a plaster "stone," phosphate investment or low fusing metal alloy.

In the particular phase of the dental impression art to which this invention relates the impression material in its initial form is generally a powder mixture consisting essentially of an alginate—either water soluble or solubilizable—and a slowly soluble salt of a cation other than an alkali metal or magnesium, and certain other auxiliary components. To the dry mixture water is added and the total composition vigorously mixed to give a plastic mass possessing a limited degree of flow. This mass sets to an elastic gel by chemical interaction of alginate and salt cation. In common use are the alkali metal alginates forming a soluble gum in water and calcium sulfate in hydrated form as the reactor or gel-precipitant. As auxiliary reactors, and in some cases as the sole reactor, lead salts such as the monosilicate, sulfate and basic carbonate have had wide application.

To the gel-forming constituents retarders are added to permit greater control and accuracy in the operation by increasing the gelling time. These retarders include the alkali metal carbonates, such as sodium carbonate or potassium carbonate, and water-soluble alkali metal phosphates such as trisodium phosphate, primary sodium phosphate, sodium metaphosphate, sodium acid pyrophosphate and tetrasodium pyrophosphate. A satisfactory retarder reacts preferentially with the slowly dissolving cations of the primary reactor until the supply of retarder is exhausted whereupon reaction with the alginate begins to effect thickening and setting. In this way the ultimate gelling reaction between the reactor cation and alginate is delayed.

In addition to the foregoing, certain fillers are employed such as talc, fullers earth, calcium carbonate, and diatomaceous earth, for example. These fillers produce a suitable consistency or "body" in the composition so that it can be handled easily in the initial period of application to the teeth. Furthermore, the fillers provide a dispersant for the other reactants in the formulation.

The composition obtainable by proper combination and balancing of the above named ingredients possess the requisites for preparation of accurate elastic dental impression gels, but their use is complicated by the adverse effect which the gel surfaces exert on the dental "stone" generally employed to obtain a cast in the gel negative. In order to avoid the soft powdery "stone" surface found in casts made in the untreated gel, the gel is first immersed in a fixing or priming solution for a greater or lesser period of time. This solution may be a combination of salts such as potassium sulfate and zinc sulfate in minor amounts as taught in Vallandigham United States Patent No. 2,390,138. Attempts have been made with varying degrees of success to avoid this complicating step in the procedure by the incorporation of certain additives, such as sodium silicofluoride, potassium zirconium fluoride, and potassium titanium fluoride with the balance of the composition described above. Unfortunately, the improvement in surface finish of the "stone" cast has been accompanied by detrimental effects on the properties of the impression gel, namely, an excessive increase in rigidity of the gel. In increasing gel rigidity, these additives have proven undesirable because the impression formed in the mouth must be first removed from the patient's teeth and finally removed from the stone cast subsequently formed therein. Moreover, the effect of increased stiffness becomes progressively more serious as the age of the impression increases beyond the first hour or two required for pouring and setting of the cast before separation. Inasmuch as the dentist frequently defers pouring the cast or separating the cast from the impression for many hours or even days, the undesirable effect attributable to the prior art additives can have serious consequences in that safe removal of the cast becomes difficult and dangerous insofar as preservation of the cast is concerned.

Accordingly, it is an object of this invention to provide a gel type dental impression composition which will set with a uniformly smooth finish.

It is a further object to provide an irreversible gel type impression composition that will permit a more accurate plaster "stone" reproduction than was heretofore possible.

It is a further object to provide an impression material that essentially maintains its initial elasticity and crushing strength whereby removal of casting from impression is facilitated.

These and other related objects are achieved by the instant invention wherein potassium ferric fluoride is added to a mold casting composition of the several components broadly described herein to achieve an unexcelled surface with a superior quality stone casting which essentially maintains a constant elasticity and crushing strength after hardening.

Because the several components in a dental impression material have an inter-related effect on the final product some variation is inherently allowable according to the amounts of any of the various ingredients. For that reason the following specific formulation in weight percent is intended only as an illustrative embodiment which will be followed by a review of properties and effects of those selected materials.

| | Percent |
|---|---|
| Potassium alginate | 13.1 |
| Terra alba | 7.3 |
| Tetrasodium pyrophosphate | 2.2 |
| Lead monosilicate | 29.2 |
| Diatomaceous earth | 43.8 |
| Potassium ferric fluoride | 4.4 |

The first ingredient to be considered is the alkali metal alginate suitable for use in this invention in commercially available forms as medium or high viscosity alginate. The medium viscosity material is rated at about 400 centipoises, while the high viscosity is on the order of 1100 centipoises. However, these values are not critical if only for the reason that alginates are marketed through a wide range of viscosities from 50 to 2000 centipoises, as either sodium or potassium alginates. With due regard for the various other ingredients I find that either sodium or potassium alginate or a mixture of the two can be used in an amount by weight of from 10 to 15 percent. The practical selection of type and amount of alginate is known in the art to be guided by the fact that, in general, a thinner mixture produces a weaker impression material with the denser mixture producing a firmer material but which denser mixture during formulation is more difficult to blend with the other ingredients.

Terra alba, which is known in the art as the primary reactor, provides the calcium ions that exchange with the sodium or potassium ions of the alginate to form the insoluble calcium alginate gel. The lower limit of terra alba that is required depends on the length of setting or gelling time desired, smaller amounts of this constituent extending the setting time. It can also be seen that too little terra alba will produce an impression too weak for satisfactory use in the vicinity of which lower limit the setting characteristics of the plastic impression mass are too sluggish. Accordingly, 3 percent by weight in the overall formula being developed here is essentially the lower limit. In general, the total composition will preferably exhibit a "snap set" which is a term used to describe a dental impression material exhibiting a short interval between initial set, at which point a glass rod will draw away from the material without any adhesion, and final set arrived at when the material assumes its final physical form. The upper limit of terra alba for the purposes of this invention is roughly about 12 percent by weight, this upper limit being most directly affected by the amount of retarder that is included to control or delay the reaction of terra alba with the alkali metal alginate.

Any of several materials have been found to be satisfactory in the role of a retarder. These are the alkali metal phosphates and carbonates specifically including the orthophosphate, pyrophosphate, tripolyphosphate, quadraphosphate and hexametaphosphate of sodium, and sodium carbonate. However, for the purposes of this invention tetrasodium pyrophosphate is definitely to be preferred. The quantity of retarder naturally depends primarily on the quantity of terra alba present but because of quality variations in these materials from one lot to the next actual amounts are added on an "as required" basis to adjust setting time with the quality of stone cast obtained being the ultimate test. Ordinarily, a three to three and one-half minute setting period is considered optimum in dental practice which requires time in which the material is mixed, inserted into the patient's mouth and formed. On the basis of using from 3 to 12 weight percent of terra alba, the amount of tetrasodium pyrophosphate, for example, can vary from 0.25 to 3 percent. To a lesser degree than that ascribable to terra alba the quantity of retarder is dependent on the quantity of two other ingredients to be subsequently discussed—lead silicate and potassium ferric fluoride.

Potassium ferric fluoride is the ingredient that constitutes the essence of the invention in improving the quality of stone cast that is obtained. From 2 to 14 weight percent of potassium ferric fluoride is feasibly employed. Below .2 percent a good stone surface does not develop and at 14 percent of potassium ferric fluoride the strength of the stone casting at final set would be approximately 2500 gm./cm.$^2$ which is ordinarily considered to be too low. Above 10 to 11 percent the strength, strain and set properties of the impression cast begin to diminish. By proper usage of this ingredient having particular regard to the amounts of alginate and terra alba a crushing strength on the order of 7000 gm./cm.$^2$ can be obtained using approximately 9 percent or less by weight of potassium ferric fluoride.

Lead monosilicate is also added to the composition to improve further the quality of the stone cast obtainable and to increase the strength of the impression gel. In the present composition 7 percent by weight gives a fairly good impression cast which, however, seems barely satisfactory. As much as 45 weight percent has been employed satisfactorily and even larger amounts could be used. Accordingly, lead monosilicate can be incorporated in the composition in from 7 percent by weight to practically no upper limit, that upper limit being dependent only on the cost factor.

To give additional body to the casting and to improve dispersion and mixing of the several ingredients a diatomaceous earth or equivalent filler is incorporated. Where a diatomaceous earth is employed the quantity to be used depends on the rest of the formulation and on the particular type of diatomaceous earth. As in the case of all fillers, a high diatomaceous earth content gives a relatively heavy body and low fluidity to the unset plastic paste, and relatively low strain and set characteristics to the gelled impression mass, strength being increased slightly. Using a calcined diatomaceous earth such as either Johns-Manville Hi-flo Supercel or Great Lakes Carbon Dicalite (white filler) satisfactory amounts are on the order of from 30 to 50 weight percent.

To illustrate the formulating technique using the formula of the specific example above, 21 grams of this composition are spatulated, or mixed, with 50 cc. of water for 1 minute to give a plastic impression mass which sets in about 3½ minutes after starting the spatulation, under normal room conditions; the gel obtained is strong, accurate elastic, and retains these characteristics for many hours and even several days when properly stored in a wet towel or humidor; the dental "stone" cast obtained by pouring a plaster "stone"—water mix into the impression and allowing to set for ¾ hour before separation is smooth, hard, and free of powder.

The term "stone" as used herein, has reference to alpha hemi-hydrate of gypsum, or material comprising basically or primarily, such alpha hemi-hydrate of gypsum.

Alpha hemi-hydrate of gypsum, while of the same chemical formulation as plaster of Paris (i. e. beta hemi-hydrate of gypsum), is a hemi-hydrate of gypsum that is calcined under steam pressure greater than atmospheric in an auto-clave, or the like, whereas plaster of Paris is calcined at atmospheric pressure. As a result, the alpha hemi-hydrate of gypsum is of different particle form and less porous and provides a surface which is harder and has better coherence, so that it will not flake, powder off, or disintegrate in applying a denture thereto.

For the full clarification of the term "stone" as used herein and understanding of the distinction between such "stone" and plaster of Paris, attention is directed to the book written by Eugene W. Skinner, Ph. D. entitled "The Science of Dental Materials," published in 1954 (prior to the filing date of the present application), by W. B. Saunders Company, Philadelphia and London, and particularly to pages 24, 25, 26, 40, 41 and 42 of said book.

After explaining, on pages 24 and 25, that dental plaster is the result of the calcining of gypsum and referring to the hemi-hydrate, the aforementioned book states, at page 25 and 26, the following:

"There appear to be two different forms of the hemi-hydrate, depending upon the method of calcination. For example, if the gypsum is heated in a kettle in the open air to the temperatures indicated in reaction (1), a crystalline form of the hemihydrate results as shown in Figure 3—3, known as β-hemihydrate,$^2$ or, more popularly, as plaster of Paris.

"Dental stone.—The β-hemihydrate crystals are characterized as being somewhat irregular in shape, in contrast to the more prismatic particles shown in Figure 3–4, which are crystals of α-hemihydrate. Alpha-hemihydrate is the product formed when the gypsum is calcined under steam pressure $^3$ in an autoclave, usually in the presence of water, at a temperature of 120° to 130° C. (250° to 265° F.) This type of product is the principal constituent of the dental stones, with which casts and models are made."

Such a composition as described exhibits the "snap set" described above, and has the special property of setting so that in essence, it retains its initial elasticity and crushing strength. In other words, it sets without becoming so extremely rigid and hard on ageing that extreme care has to be taken to prevent breaking of teeth from the cast when the impression material is removed. When used as an impression material the composition of this invention gains an additional advantage to the extent that the potassium ferric fluoride lowers only slightly the pH obtained by the use of the balance of the ingredients of the composition exclusive of the additive. The potassium ferric fluoride yields a gel when employed in combination with the balance of the composition which exhibits a pH greater than 7, which is higher than that found with other compositions containing less bland and more acidic additives, which have been used heretofore. This is advantageous in reducing the possibility of irritation or of allergenic effects in either the patient or the practitioner, possibilities which have been attributed to the use of the more acidic compositions.

Having thus described my invention, I claim:

1. A dental impression composition consisting essentially of a water-soluble alginate, a compound contributing a cation which forms an elastic gel with said alginate, and about 2% to about 14% by weight of potassium ferric fluoride.

2. A dental impression composition consisting essentially of a water-soluble alginate terra alba, tetrasodium pyrophosphate, about 2% to about 14% by weight of potassium ferric fluoride, lead monosilicate, and diatomaceous earth.

3. A dental impression composition consisting essentially of by weight about 10% to about 15% of a water-soluble alginate, about 3% to about 12% of terra alba, about 0.25% to about 3% of tetrasodium pyrophosphate, about 2% to about 14% of potassium ferric fluoride, about 7% to about 45% of lead monosilicate, and about 30% to about 50% of diatomaceous earth.

4. A dental impression composition consisting essentially of the following ingredients in substantially the following percentages:

| | Percent |
|---|---|
| Potassium alginate | 13.1 |
| Terra alba | 7.3 |
| Tetrasodium pyrophosphate | 2.2 |
| Lead monosilicate | 29.2 |
| Diatomaceous earth | 43.8 |
| Potassium ferric fluoride | 4.4 |

5. A dental impression composition consisting essentially of a water-soluble alginate, a primary reactor reactive with said water-soluble alginate to form an elastic gel impression in which and against the impression composition a stone base cast may be formed, a retarder of the group consisting of orthophosphate, pyrophosphate, tripolyphosphate, quadraphosphate, hexametaphosphate of sodium, tetrasodium phosphate and sodium carbonate, a lead compound, a filler material, and about 2% to about 14% by weight of potassium ferric fluoride.

6. A dental impression composition according to claim 5 wherein terra alba constitutes the primary reactor.

7. A dental impression composition according to claim 5 wherein diatomaceous earth constitutes the filler.

8. A dental impression composition according to claim 5 wherein lead monosilicate constitutes the lead compound.

9. A dental impression composition consisting essentially of a water-soluble alginate, a primary reactor reactive with said water-soluble alginate to form an elastic gel impression in which and against the impression composition a stone base cast may be formed, a pyrophosphate, a lead compound, a filler material, and about 2% to about 14% by weight of potassium ferric fluoride.

References Cited in the file of this patent

UNITED STATES PATENTS

| Re. 23,700 | Lochridge | Aug. 18, 1953 |
| 2,165,680 | Stangenberg et al. | July 11, 1939 |
| 2,623,808 | Meyer | Dec. 30, 1952 |
| 2,628,153 | Noyes et al. | Feb. 10, 1953 |
| 2,652,312 | Fink | Sept. 15, 1953 |
| 2,678,280 | Noyes et al. | May 11, 1954 |